United States Patent [19]

McGrath

[11] 3,898,198

[45] Aug. 5, 1975

[54] POLYAMIDE CATALYST SYSTEM

[75] Inventor: Harry McGrath, Pontypool, England

[73] Assignee: Imperial Chemical Industries Limited, London, England

[22] Filed: Nov. 8, 1973

[21] Appl. No.: 414,095

[30] Foreign Application Priority Data
Dec. 18, 1972 United Kingdom............. 58291/72

[52] U.S. Cl. .............................................. 260/78 L
[51] Int. Cl.² ....................................... C08G 69/16
[58] Field of Search ................................... 260/78 L

[56] References Cited
UNITED STATES PATENTS

| 3,027,356 | 3/1962 | Schickh et al. | 260/78 L |
| 3,321,447 | 5/1962 | Kunde et al. | 260/78 L |
| 3,410,832 | 11/1968 | Griehl et al. | 260/78 L |
| 3,779,998 | 12/1973 | Hermann | 260/78 L |
| 3,809,678 | 5/1974 | Kriesten et al. | 260/45.85 R |

FOREIGN PATENTS OR APPLICATIONS

| 1,261,286 | 4/1961 | France | 260/78 L |

Primary Examiner—Lucille M. Phynes
Attorney, Agent, or Firm—Cushman, Darby & Cushman

[57] ABSTRACT

Polymerisation of $\omega$-dodecanolactam in the presence as catalysts jointly of a catalytically active inorganic acid, as defined, and oxalic acid or an ester of oxalic acid.

9 Claims, No Drawings

POLYAMIDE CATALYST SYSTEM

The present invention relates to the preparation of poly-ω-dodecanolactam by the polymerisation of ω-dodecanolactam in the presence of catalysts.

According to the present invention we provide a process comprising the polymerisation of ω-dodecanolactam in the presence as catalysts jointly of a catalytically active inorganic acid, as hereinafter defined, and oxalic acid or an ester of oxalic acid.

By the term "inorganic acid" we mean hydrochloric acid, boric acid, phosphoric acid, phosphorous acid, phosphonic acid, magnesium hydrogen phosphate, cyclohexyl phosphonic acid and sulphonic acids.

Preferably the inorganic acid should be other than hydrochloric acid, since the presence of hydrochloric acid tends to give rise to corrosion of metal surfaces in the vapour space of the reactor.

Preferably the sulphonic acid should be para toluene sulphonic acid.

Preferably the catalytically active inorganic acid should be present at a level of from 0.1 to 3 percent by weight, based on the ω-dodecanolactam. The use of a proportion in excess of 1% on the ω-dodecanolactam confers no advantage over the use of 1%.

The ester of oxalic acid may be a mono- or diester, and may be an aliphatic, aromatic, cycloaliphatic or mixed aliphatic-aromatic ester.

We believe that in the reaction the ester of oxalic acid functions as oxalic acid following hydrolysis. We have found a proportion of oxalic acid or ester equivalent to 0.1 to 1.0% by weight of oxalic acid, based on ω-dodecanolactam, to be effective. Preferably the lower level should be at least 0.2%.

The polymerisation process is preferably carried out at 250° – 300°C. It is preferable for the heating to be carried out under an oxygen-free atmosphere, for example under nitrogen or carbon dioxide, to avoid discolouration of the polymer. The polymerisation process may be carried out under known conditions for example in a vessel from which all air and water have been removed by boiling a suitable liquid, for example toluene, in the vessel, or by evacuating the vessel and flushing with inert gas, for example nitrogen. We have found particularly advantageous results when using a reaction temperature of 265° – 295°C.

If desired, polymerisation may be carried out according to the process of the present invention in the presence of monofunctional compounds which, by acting as chain terminators, control the molecular weight of the product. Monobasic carboxylic acids, for example acetic acid or stearic acid, may be used for this purpose. Dicarboxylic acids other than oxalic acid which serve as chain terminators may also be used for this purpose, for example adipic acid and succinic acid.

In the following examples of the process of our invention, the relative viscosity is determined using a solution of 1 g. of polymer in 100 ml. of metacresol at 25°C.

The poly-ω-dodecanolactam prepared according to the process of our invention may be used for moulding purposes or for melt spinning to form fibres or filaments.

An advantage of the process of our invention is that by means of it the polymerisation of ω-dodecanolactam may be effected at a higher rate than when using known single catalysts or known combinations of catalysts, or when using oxalic acid alone as catalyst under comparable conditions. The relatively high rate of polymerisation is shown by the relatively higher relative viscosity and the relatively lower percentage of material extractable by methanol for the poly ω-dodecanolactam prepared under comparable conditions according to our invention.

In the following examples of the process of our invention the relative viscosity is determined using a solution of 1 g. of polymer in 100 ml. of metacresol at 25°C. In the examples all parts and percentages are by weight. Examples 1, 3 to 6, 17, 19, 21, 22, 23, 25, 28, 29, 31, 33, and 34 are for comparison purposes only.

EXAMPLE 1

| ω-Dodecanolactam | 1095 | pts |
|---|---|---|
| p-Toluene sulphonic acid | 8.3 | pts |
| Water | 100 | pts |
| Stearic Acid | 13.3 | pts | were charged to a reaction vessel and then heated to 285°C. under a blanket of nitrogen whilst stirring. The temperature of the mixture was maintained at 285°C. for 5 hours and the polymer then extruded.

Relative viscosity = 2.5 Methanol extracted material % = 5.5.

EXAMPLE 2

| Oxalic acid | 5.5 | pts |
|---|---|---|
| ω-Dodecanolactam | 1095 | pts |
| p-Toluene sulphonic acid | 8.3 | pts |
| Water | 100 | pts |
| Stearic Acid | 13.5 | pts |

Method as for Example 1. Heated for 3 hours at 285°C.

Relative viscosity = 2.61. Methanol extracted material = 2.1.

Examples 3 to 33 were carried out similarly to Example 2, differences being indicated in the Table of conditions and properties of the polymer.

EXAMPLE 34

| ω-Dodecanolactam | 190 | pts |
|---|---|---|
| Cyclohexyl phosphonic acid | 1.42 | pts |
| Stearic acid | 2.60 | pts |
| Water | 10 | pts |

The above materials were charged to an autoclave, open to the atmosphere and then heated to 285°C. under a blanket of nitrogen. Stirring was started as soon as possible. The mixture was heated at 285°C. for 6½ hours and then extruded.

The polymer had the following analysis:

| Methanol Extractables | <1% |
|---|---|
| Relative Viscosity | 2.72 |

| Example | Dodecanol Lactam parts | Catalyst Name | Parts by weight | w/w % | Co-catalyst Name | Parts by weight | w/w % |
|---|---|---|---|---|---|---|---|
| 3 | 1094 | Cyclohexyl Phosphonic acid | 8.3 | 0.75 | None used | | |
| 4 | 1094 | " | 8.3 | 0.75 | None used | | |
| 5 | 1094 | " | 8.3 | 0.75 | None used | | |
| 6 | 99 | " | 0.75 | 0.75 | None used | | |
| 7 | 99 | " | 0.75 | 0.75 | Oxalic acid | 0.5 | 0.5 |
| 8 | 99 | " | 0.75 | 0.75 | " | 0.25 | 0.25 |
| 9 | 99 | " | 0.50 | 0.50 | " | 0.50 | 0.50 |
| 10 | 99 | " | 0.25 | 0.25 | " | 0.50 | 0.50 |
| 11 | 99 | " | 0.75 | 0.75 | " | 0.50 | 0.50 |
| 12 | 99 | p-toluene-sulphonic acid | 0.75 | 0.75 | " | 0.50 | 0.50 |
| 13 | 99 | " | 0.75 | 0.75 | " | 0.50 | 0.50 |
| 14 | 99 | " | 0.75 | 0.75 | " | 0.50 | 0.50 |
| 15 | 99 | " | 0.75 | 0.75 | " | 0.50 | 0.50 |
| 16 | 99 | " | 0.75 | 0.75 | " | 0.5 | 0.5 |
| 17 | 99 | Phosphoric acid | 0.75 | 0.75 | None used | — | — |
| 18 | 99 | " | 0.75 | 0.75 | Oxalic acid | 0.5 | 0.5 |
| 19 | 99 | Hydrochloric acid | 0.75 | 0.75 | None used | — | — |
| 20 | 99 | " | 0.75 | 0.75 | Oxalic acid | 0.5 | 0.5 |
| 21 | 99 | Sulphuric acid | 0.75 | 0.75 | None used | — | — |
| 22 | 99 | " | 0.75 | 0.75 | Oxalic acid | 0.5 | 0.5 |
| 23 | 99 | Phosphorous Acid | 0.75 | 0.75 | None used | — | — |
| 24 | 99 | " | 0.75 | 0.75 | Oxalic acid | 0.5 | 0.5 |
| 25 | 99 | p-toluene sulphonic acid | 0.75 | 0.75 | Glyoxal | 0.5 | 0.5 |
| 26 | 99 | " | 0.75 | 0.75 | Dibutyl oxalate | 0.5 | 0.5 |
| 27 | 99 | " | 0.75 | 0.75 | Diethyl oxalate | 0.5 | 0.5 |
| 28 | 99 | " | 0.75 | 0.75 | None used | — | — |
| 29 | 99 | Oxalic acid | 0.75 | 0.75 | None used | — | — |
| 30 | 99 | Boric acid | 0.75 | 0.75 | Oxalic acid | 0.5 | 0.5 |
| 31 | 99 | " | 0.75 | 0.75 | None used | — | — |
| 32 | 99 | Magnesium hydrogen phosphate | 0.75 | | Oxalic acid | 0.5 | — |
| 33 | 90 | " | 0.75 | | None used | — | — |

| Example | Chain Terminator Name | Parts by weight | mol. % | Time hrs | Temp °C | Methanol Extractable % | Relative Viscosity |
|---|---|---|---|---|---|---|---|
| 3 | Sebacic acid | 6.7 | 0.6 | 4½ | 285 | 2.82 | 1.4 |
| 4 | Oxalic acid | 6.0 | 1.2 | 2 | 285 | Gelled | |
| 5 | Maleic acid | 3.3 | 0.6 | 5 | 285 | 2.15 | 2.1 |
| 6 | Sebacic acid | 0.91 | 0.9 | 4 | 275 | 12.00 | 1.74 |
| 7 | " | 0.91 | 0.9 | 4 | 275 | <1 | 1.86 |
| 8 | " | 0.91 | 0.9 | 4 | 275 | <1 | 1.81 |
| 9 | " | 0.91 | 0.9 | 4 | 275 | 2.2 | 1.71 |
| 10 | " | 0.91 | 0.9 | 4 | 275 | 16.0 | 1.78 |
| 11 | Adipic acid | 0.66 | 0.9 | 4 | 275 | ◁ | 2.01 |
| 12 | " | 0.60 | 0.85 | 3 | 275 | ◁ | 2.07 |
| 13 | " | 0.40 | 0.60 | 3 | 295 | ◁ | 2.58 |
| 14 | " | 0.40 | 0.40 | 1½ | 295 | ◁ | 2.04 |
| 15 | " | 0.40 | 0.4 | 3 | 285 | ◁ | 2.19 |
| 16 | " | 0.4 | 0.6 | 3 | 267 | 2.4 | 1.95 |
| 17 | " | 0.6 | 0.90 | 3 | 275 | 4.3 | 1.83 |
| 18 | " | 0.6 | 0.90 | 3 | 275 | ◁ | 2.36 |
| 19 | " | 0.6 | 0.90 | 3 | 275 | 4 | 1.45 |
| 20 | " | 0.6 | 0.90 | 3 | 275 | <1 | 1.54 |
| 21 | Adipic acid | 0.6 | 0.90 | 3 | 275 | Very little polymerisation | |
| 22 | " | 0.6 | 0.90 | 3 | 275 | | |
| 23 | " | 0.6 | 0.90 | 3 | 275 | 7 | 1.60 |
| 24 | " | 0.6 | 0.90 | 3 | 275 | <1 | 2.00 |
| 25 | " | 0.6 | 0.90 | 3 | 275 | 3.6 | 1.69 |
| 26 | " | 0.6 | 0.90 | 3 | 275 | 2.4 | 1.85 |
| 27 | " | 0.6 | 0.90 | 3 | 275 | 1.9 | 1.69 |
| 28 | " | 0.60 | 0.90 | 3 | 275 | 7.8 | 1.51 |
| 29 | " | 0.60 | 0.90 | 6 | 275 | Very little polymerisation | |
| 30 | " | 0.40 | 0.6 | 4 | 275 | 58.5 | 2.03 |
| 31 | " | 0.40 | 0.6 | 4 | 275 | 63.5 | 1.75 |
| 32 | " | 0.40 | | 6 | 275 | 42.4 | 1.95 |
| 33 | " | 0.40 | | 6 | 275 | 79.5 | 1.95 |

EXAMPLE 35

| | | |
|---|---|---|
| ω-Dodecanolactam | 197 | pts |
| Cyclohexyl phosphonic acid | 1.50 | pts |
| Oxalic acid | 1.00 | pt |
| Adipic acid | 0.76 | pts |
| Water | 10.00 | pts |

Method as for Example 34 but the heating was for only 3 hours.

| | |
|---|---|
| Methanol Extractables | <1% |
| Relative Viscosity | 2.88 |

What we claim is:

1. A process for the preparation of moldable or melt spinnable poly(ω-dodecanolactam) comprising the polymerisation of ω-dodecanolactam in the presence as catalysts jointly of a catalytically active inorganic acid selected from the group consisting of hydrochloric acid, boric acid, phosphoric acid, phosphorous acid, phosphonic acid, magnesium hydrogen phosphate, cyclohexyl phosphonic acid and sulphonic acids, and oxalic acid or an ester of oxalic acid.

2. A process according to claim 1 in which the inorganic acid is other than hydrochloric acid.

3. A process according to claim 1 wherein the sulphonic acid is para-toluene sulphonic acid.

4. A process according to claim 1 wherein the inorganic acid is present at a level of from 0.1 to 3 percent by weight, based on the ω-dodecanolactam.

5. A process according to claim 1 wherein the proportion of oxalic acid or oxalic acid ester present is equivalent to 0.1 to 1.0 percent by weight of oxalic acid, based on the ω-dodecanolactam.

6. A process according to claim 5 wherein the proportion of oxalic acid or oxalic acid ester present is equivalent to at least 0.2 percent of oxalic acid.

7. A process according to claim 1 wherein the reaction is carried out at 250° – 300°C.

8. A process according to claim 1 wherein the reaction is carried out at 265° – 295°C.

9. A process according to claim 1 wherein the reaction is carried out under an oxygen-free atmosphere.

* * * * *